Aug. 14, 1928.
W. I. WHEELER
METHOD FOR MAKING PLOWSHARES
Filed March 28, 1923
1,680,830
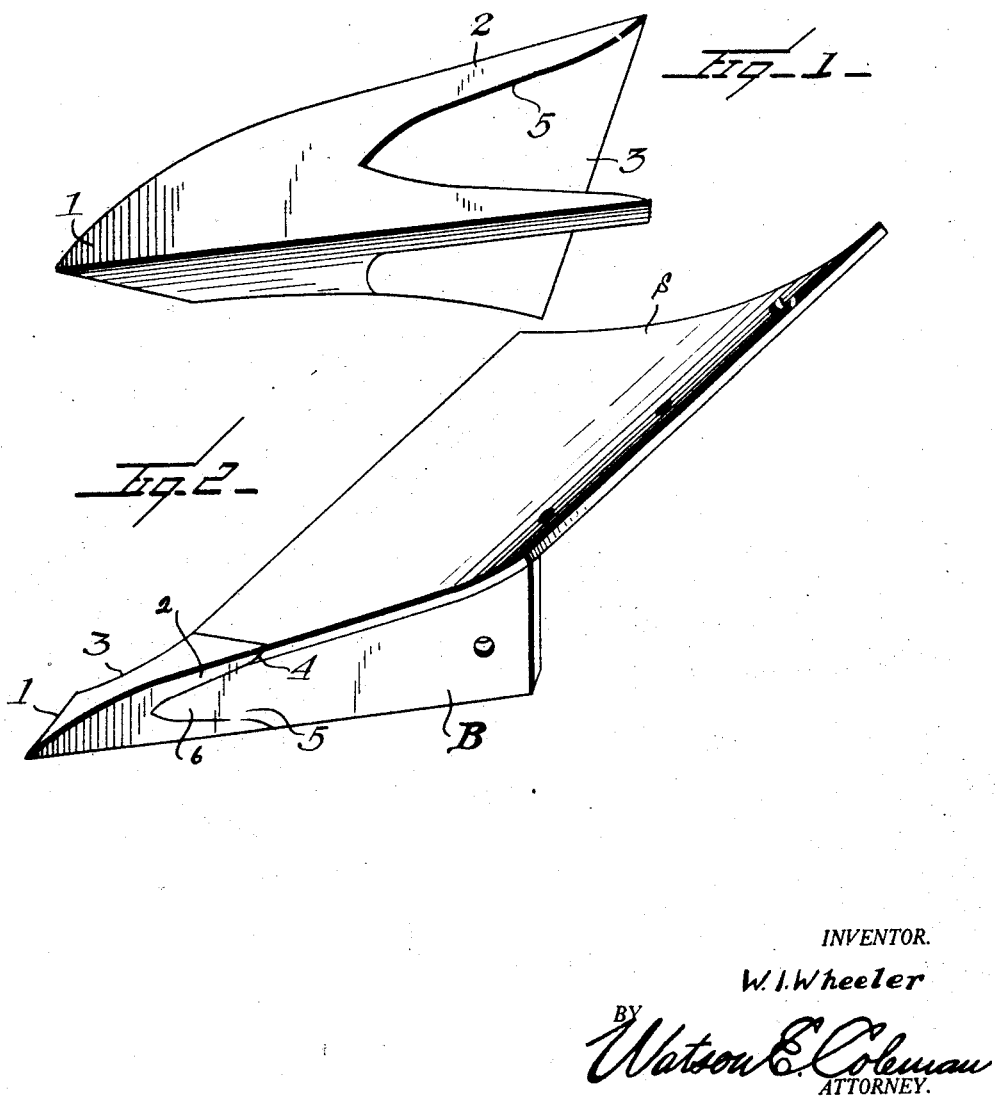
INVENTOR.
W. I. Wheeler
BY Watson E. Coleman
ATTORNEY.

Patented Aug. 14, 1928.

1,680,830

UNITED STATES PATENT OFFICE.

WILLIAM ISIAH WHEELER, OF SCOTTVILLE, ILLINOIS.

METHOD FOR MAKING PLOWSHARES.

Application filed March 28, 1923. Serial No. 628,282.

This invention relates to methods for making plow shares and it is an object of the invention to provide a novel and improved method for this purpose whereby a share and land side bar or point may be effectively welded in assembled relation by an acetylene torch, electric torch or other kindred fusion process and which operation can be accomplished much quicker and to better advantage than by the hammering process now generally employed.

Another object of the invention is to provide a novel and improved method whereby the assembly of the share is effected without any hammering process whereby the point is saved from being wasted away and hammered out of proper shape as usually occurs with any hammering process of welding and whereby my improved method avoids the necessity of initially providing extra material for allowance in forging and shrinkage.

The novel features of my invention will hereinafter be definitely claimed.

In order that my invention may be the better understood, I will now proceed to describe the same with reference to the accompanying drawings, wherein:—

Figure 1 is a view in perspective of a point and lower share portion arranged in accordance with an embodiment of my invention;

Figure 2 is a view in perspective of the device illustrated in Figure 1 in applied position;

In the embodiment of the invention as herein disclosed, I employ a point 1 preferably of steel and which has integrally formed therewith a portion 2 of a land side bar and also integrally formed therewith a lower portion 3 for a share S. The point 1 and the parts integral therewith are adapted to be initially forged and the rear edge of the bar portion 2 and also of the share portion 3 are beveled as indicated at 4. The bar portion 2 is bifurcated or forked, as at 5, to snugly receive the extension 6 at the forward or point end portion of the bar B proper.

In applying the plow share point, all that is necessary to do is to measure the share S to determine the point where the bar B is the same width as the free end of the bar portion 2 of the plow share point and then cut the old point off at such location and bevel grind the forward end portion of the share S as indicated at 4. The plow share point is then placed in proper position as indicated in Figure 1 and the bar portion 2 welded to the bar B and the share portion 3 welded to the share S, and which operation can be performed in a very few minutes by an acetylene torch, electric torch, or kindred fusion process. The repointing of a worn plow in accordance with the method as hereinbefore set forth is of material advantage and it results in the elimination of any hammering process and thus saves the point from being wasted away and hammered out of proper shape as generally occurs with any hammering process of welding and for which reason it is not required to provide extra amount of material to compensate for forging and shrinkage.

I claim:—

A method for pointing a plow share consisting in providing an initially formed plow share point having a bar portion having its rear end formed to provide a fork, and a lower share portion integrally connected thereto, fitting the share proper to the bar portion and share portion and within the fork, and then fusing the abutting edge portions together.

In testimony whereof I hereunto affix my signature.

WILLIAM ISIAH WHEELER.